United States Patent
Foelsche et al.

(10) Patent No.: US 6,814,688 B2
(45) Date of Patent: Nov. 9, 2004

(54) METHOD AND ARRANGEMENT FOR CONTROLLING A DRIVE UNIT

(75) Inventors: Volkmar Foelsche, Heilbronn (DE); Mario Kustosch, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/259,461

(22) Filed: Sep. 30, 2002

(65) Prior Publication Data

US 2003/0064856 A1 Apr. 3, 2003

(30) Foreign Application Priority Data

Sep. 29, 2001 (DE) .......................................... 101 48 343

(51) Int. Cl.$^7$ .......................... F16H 59/48; G06F 17/00; G06F 19/00; G06F 7/00
(52) U.S. Cl. .......................... 477/120; 477/34; 477/904; 701/53; 701/61
(58) Field of Search .......................... 477/120, 34, 904; 701/53, 59, 61

(56) References Cited

U.S. PATENT DOCUMENTS

| 5,163,530 A | * | 11/1992 | Nakamura et al. | .......... | 180/197 |
| 5,325,740 A | | 7/1994 | Zhang et al. | | |
| 6,063,004 A | * | 5/2000 | Ibamoto et al. | ................ | 477/47 |
| 6,068,574 A | | 5/2000 | Wild et al. | | |
| 6,076,032 A | * | 6/2000 | Kuroda et al. | ................ | 701/54 |
| 6,098,592 A | | 8/2000 | Hess et al. | | |
| 6,377,884 B1 | * | 4/2002 | Loeffler et al. | ................ | 701/54 |

FOREIGN PATENT DOCUMENTS

| DE | 19619324 A1 | * | 4/1997 | .......... B60K/26/00 |
| DE | 100 48 015 | | 10/2001 | |

* cited by examiner

Primary Examiner—Tisha Lewis
(74) Attorney, Agent, or Firm—Walter Ottesen

(57) ABSTRACT

In a method for controlling a drive unit, a driver command value is formed while considering the current transmission ratio and the drive unit is controlled in dependence upon the driver command value. In addition, a predicted driver command value is determined in dependence upon transmission ratios other than the current transmission ratio. In addition, the minimum and maximum possible values are considered in the formation of the driver command value. A correction of the driver command value is undertaken in dependence upon the difference between minimum possible torque and minimum requested torque or between maximum possible torque and maximum requested torque.

12 Claims, 4 Drawing Sheets

METHOD AND ARRANGEMENT FOR CONTROLLING A DRIVE UNIT

BACKGROUND OF THE INVENTION

In connection with electronic control systems for drive units of motor vehicles, the driver command for the longitudinal movement of the vehicle is detected. The driver command is primarily derived from the extent of the actuation of an operator-controlled element actuated by the driver. The operator-controlled element is, for example, an accelerator pedal. For this purpose, various solutions are suggested in the state of the art. German patent publication 196 19 324 discloses, for example, the determination of a desired value for a torque of an internal combustion engine in that a signal, which represents the accelerator pedal position, is interpolated between a changing maximum value and a changing minimum value. The maximum torque is then dependent upon the engine rpm, air pressure, air temperature, ignition angle setting, et cetera; whereas, the minimum torque includes: an output signal of the idle controller, the ratio of idle desired rpm and engine rpm, the loss torque because of inner friction of the engine in dependence upon engine rpm and the engine temperature as well as the torques which ancillary consumers consume for their operation and which do not contribute to the propulsion of the vehicle. In the illustrated embodiment of this known solution, the inner torque of an internal combustion engine (that is, the torque generated by combustion) is computed. For this reason, the minimum torque is set to the value zero when there is overrun operation.

U.S. Pat. No. 6,068,574 discloses another solution for determining the driver command torque. Here, the internal torque of the engine is not pregiven as the driver command but a torque which occurs at the output end of the transmission (wheel torque, transmission output torque, et cetera). Here too, a desired wheel torque is determined in dependence upon a signal representing the position of the accelerator pedal. Here, an interpolation is made between a maximum value of the wheel torque and a minimum value of the wheel torque. At least some of the described quantities are used to determine the minimum and maximum torques. By considering data as to the transmission ratios, which are present in the drive train, these torque values relate to the transmission output end torques.

From U.S Pat. No. 5,325,740, it is known to determine an output torque desired value or wheel torque desired value in dependence upon a signal, which represents the accelerator pedal actuation, as well as on the output rpm or vehicle speed.

The known ways for processing the driver command are directed exclusively to the objective of controlling the engine. For this reason, there is an optimizing requirement with respect to the processing of the driver command for other control systems such as for a transmission or drive train control.

SUMMARY OF THE INVENTION

In the specific configuration of the driver command processing, it is of central significance that dead travel is avoided notwithstanding the scaling of the driver command torque.

With the formation of a predicted driver command torque based on the evaluation of a future possible drive train transmission ratio, the requirements of other control systems are also considered in the processing of the driver command. These requirements of other control systems are especially transmission controls or drive train controls and not only the control of the engine.

A clear task distribution of the driver command processing and another system (for example, a transmission control or coordinated drive train control) is made possible via the formation of driver command torque and predicted driver command torque and the output to an interface to other control systems. In this way, the driver command quantity can be determined centrally at one location so that other driver command processing in the vehicle for other control systems is unnecessary. A use of the accelerator pedal position as an input quantity is no longer necessary outside of the driver command processing.

It is especially advantageous when the driver command processing reads in information as to the state of the drive train, for example, from a transmission control unit.

In an especially advantageous manner, dead travel is completely avoided because of the consideration of the difference between the computed driver command torque and the minimum value or maximum value in the formation of the driver command torque notwithstanding the scaling of the driver command torque.

With the specific type of driver command formation, a driving behavior is made possible, which is independent in wide ranges from ambient influences. This is so because, in this range, a fixed relationship is present between accelerator pedal position and propulsion torque. A deviation from this fixed relationship takes place to avoid dead travel only in the proximity of the minimum and maximum values.

The application of the driver command formation is easily carried out so that the driver command processing can be flexibly adapted to different customer wishes.

In an especially advantageous manner, a distinction between the areas of overrun operation, idle or accelerative force with reference to the driver command processing is not necessary because the driver command torque formation covers all of these areas.

It is further advantageous that this driver command processing can be applied to all present day known drive concepts, for internal combustion engines, electric motors, et cetera. In this way, a torque-neutral shifting can be realized for all types of drives because the driver command torque is defined as a transmission output torque.

BRIEF DESCRIPTION OF THE DRAWINGS

The invention will now be described with reference to the drawings wherein.

DESCRIPTION OF THE PREFERRED EMBODIMENT OF THE INVENTION

Figure 1:
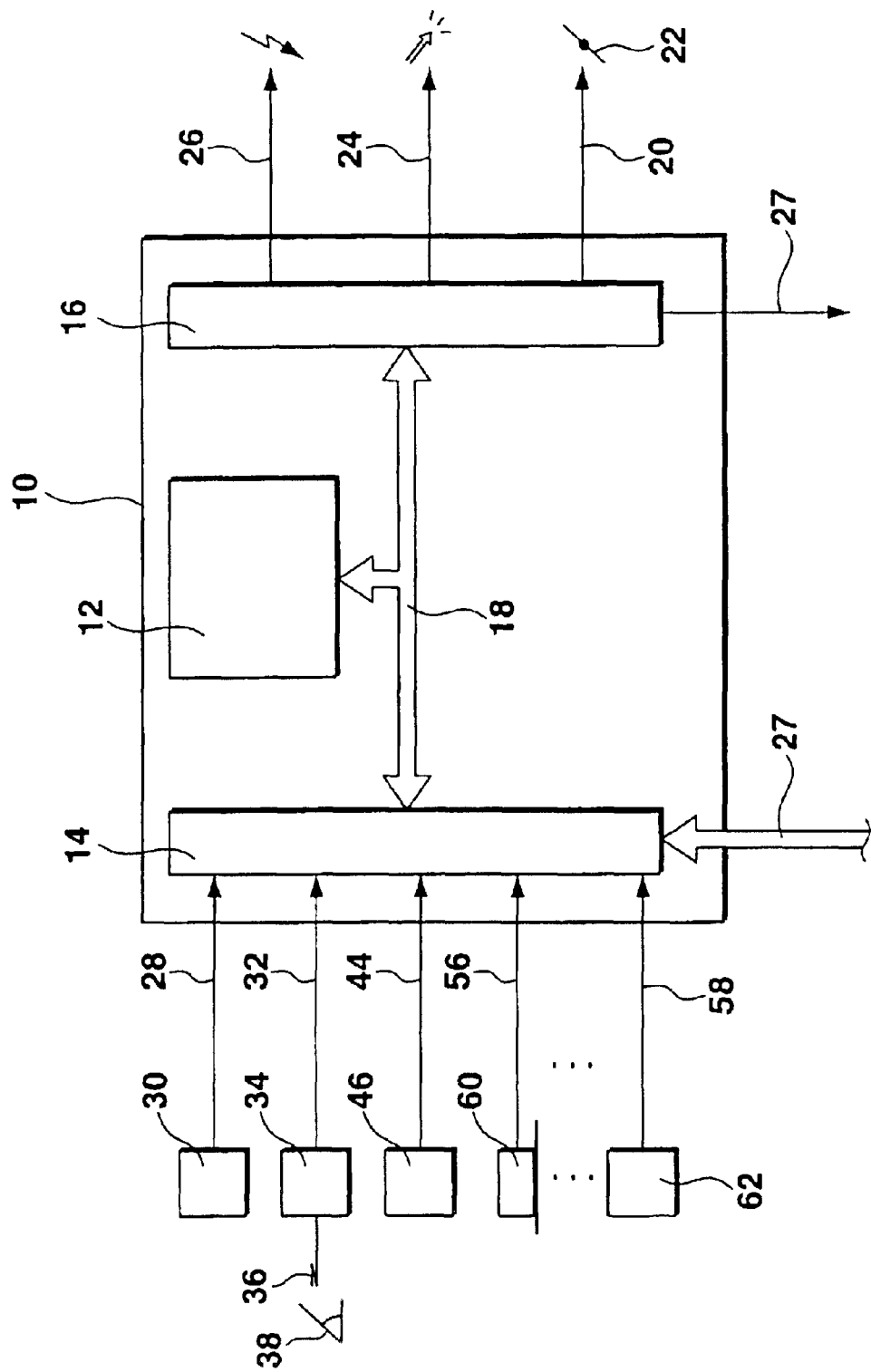
FIG. 1 is an overview circuit diagram of a control arrangement for controlling a drive unit.

FIG. 1 shows an electronic control unit 10, which includes at least a microcomputer 12 as well as input circuits 14 and output circuits 16. The input circuits 14, the microcomputer 12 and the output circuits 16 are connected with a communications system 18 for mutual exchange of data. Various input lines from different measuring devices, operator-controlled elements, et cetera are connected to the input circuit 14. Output lines are connected to the output circuit 16 of the control unit 10 and the power parameters of the drive unit are influenced via these output lines. In the preferred embodiment, the drive unit is an internal combustion engine. A first output line 20 therefore leads to an electrically actuable throttle flap 22 for influencing the air supply to the engine. The control unit 10 influences fuel metering and ignition time point via additional output lines 24 and 26. Furthermore, an output line 27 is provided which, in the preferred embodiment, is a bus system via which information from the control unit is outputted to other control systems or received at the input end. In another embodiment, the drive unit is a diesel engine wherein primarily the fuel metering is controlled.

An input line 28 connects the control unit 10 to a measuring device 30 for detecting the engine rpm. An input line 32 leads from a measuring device 34 to the control unit 10. The measuring device 34 is connected via a mechanical connection 36 to an operator-controlled element 38 such as an accelerator pedal. The operator-controlled element 38 is actuated by the driver. A further input line 40 connects the control unit 10 to a measuring device 42 for detecting the driving speed or output rpm of the drive train. For detecting the transmission ratio in the drive train, a control unit for transmission control transmits an information via the data connection 27 (in an embodiment having an automatic transmission) to the control unit 10. This information concerns the current transmission ratio in the drive train and, if necessary, the future possible transmission ratio. Additional input lines 56 to 58 connect the control unit 10 to measuring devices 60 to 62, which detect additional operating variables of the engine and/or of the vehicle, such as: engine temperature, exhaust-gas composition, battery voltage, engine load, status information as to the actual operating state of ancillary consumers such as climate control systems, power steering, et cetera.

In the preferred embodiment, the procedure described below is shown for an internal combustion engine. The described solution is used with the corresponding advantages also for alternative drive concepts such as electric drives.

In the preferred embodiment, the electronic control unit (the microcomputer 12) forms, with the aid of computer programs, a so-called driver command torque on the basis of the degree of actuation of the operator-controlled element 38. This driver command torque functions as a desired value for a torque, which is to be outputted by the drive unit or by the drive train, and is realized via the control of the power parameters of the drive unit and/or of the drive train.

Figure 2:
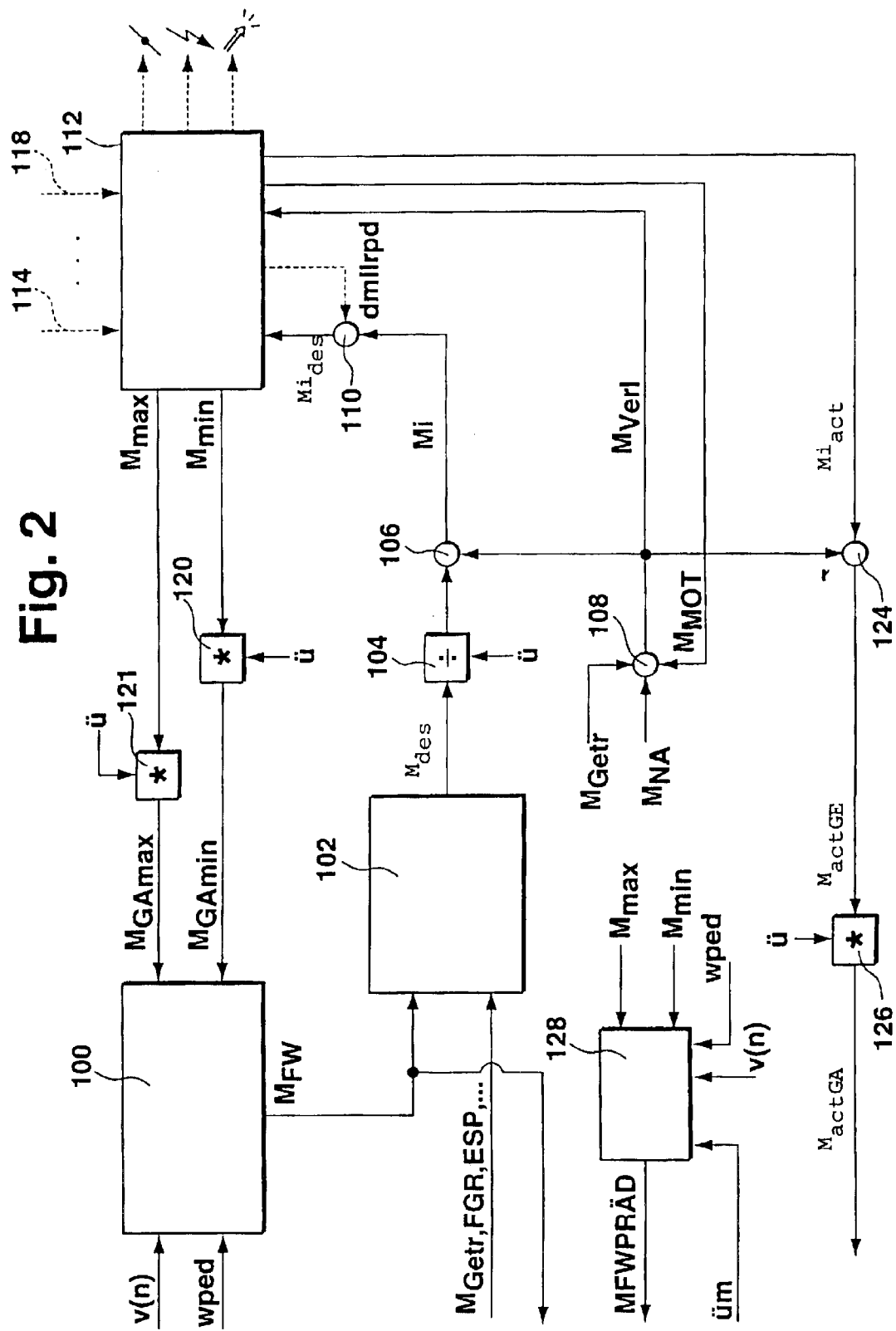
FIG. 2 is a sequence diagram which outlines the driver command processing in the context of a control system for the drive unit with interfaces to other control systems.

In FIG. 2, a sequence diagram is shown which illustrates the formation of the driver command in the context of a motor control communicating with other control systems. The blocks used define programs, program steps or program parts which execute the given function, whereas the connecting lines represent the flow of information.

The driver command processing 100 forms a driver command torque MFW (in a subsequently described procedure or in a manner known per se) in dependence upon the accelerator pedal position WPED and the vehicle speed V or the motor rpm N (if required, while considering the maximum and minimum values of the transmission output torques MGAMAX and MGAMIN). This driver command torque MFW defines a transmission output torque (in another embodiment, a wheel torque), which is wanted by the driver, and which is supplied to the desired-value coordinator 102. In this coordinator 102, a resulting desired torque MDES is determined for the adjustment via the motor. This resulting desired torque MDES is determined from the driver command torque MFW as well as desired torques (Mgetr, MFGR, MESP) of other control systems such as a transmission control, a speed controller FGR or a stability program ESP. This resulting transmission output desired torque is divided in the computation stage 104 by the current transmission ratio $\ddot{U}$ and is converted on the plane of the motor output torques. The resulting motor output desired torque is converted in the logical element 106 into a desired value MI for the inner torque of the engine while considering the loss torques MVERL. The loss torques include the loss torque MMOT of the motor (friction, et cetera), which are formed in the logic element 108, the loss torques of the transmission MGETR (for example, of the converter) as well as the torques MNA, which are needed for driving ancillary equipment. The desired value for the inner torque of the internal combustion engine is corrected in a logic element 110 with an output signal DMLLRPD of the idle controller and the desired torque value MIDES, which arises therefrom, is supplied to the internal combustion engine control 112. In the control 112, the desired torque value is converted into actuating quantities while considering other operating variables (symbolized by the inputs 114 to 118). These actuating quantities influence the power parameters of the engine, for example, the throttle flap, ignition angle and fuel metering.

In addition, the loss torques MVERL are supplied to the engine control 112, for example, as described hereinafter for forming the minimum torque.

In addition to the conversion of the desired torque value into actuating variables, a maximum torque MMAX and a minimum torque MMIN are formed in the engine control 112 as described hereinafter or as known from the state of the art. The maximum torque MMAX and the minimum torque MMIN are converted in the logic elements 120 and 121 into the maximum and minimum torques of the transmission output torque MGAMAX and MGAMIN while considering the existing transmission ratio or drive train ratio $\ddot{U}$. In addition, the engine control 112 forms the engine loss torque MMOT, which is supplied to logic element 108, while considering engine rpm and engine temperature, for example, in accordance with characteristic lines. Furthermore, the inner actual torque MIACT is computed from which the loss torque MVERL is subtracted in the logic element 124 to form the transmission input actual torque MACTGE. The transmission input torque is corrected in the correction stage 126 with the drive train ratio $\ddot{U}$ so that the transmission output actual torque MACTGA is formed, which is made available to other control systems.

The following are known from patent application publication 2003/100405 A1: specific configurations for coordinating the desired torque in 102, converting the desired torque, the computation of loss torques and actual torques.

A special characteristic of the illustration shown in FIG. 2 is the fact that the driver command torque, which is determined in 100, is made available, on the one hand, directly and, on the other hand, as a predicted driver command torque MFWPRAD to other control systems, especially transmission control systems or drive train control systems. The predicted driver command torque is formed in 128. This part is likewise part of the driver command processing 100 and is shown separately in FIG. 2 only for reasons of clarity. The predicted driver command torque defines the driver command torque which could result from another transmission ratio ÜM. Stated otherwise, the predicted driver command torque is the torque which the driver would want when the transmission ratio ÜM is set. The transmission ratio ÜM is transmitted from a transmission control or a drive train control and defines in one embodiment the possible transmission ratio whereinto a switching operation can take place. From driver command torque and predicted driver command torque, a transmission control determines, for example, the necessity of a shift operation, namely, when the current driver command torque and the predicted driver command torque differ greatly. In a preferred embodiment, the predicted driver command torque is formed in dependence upon accelerator pedal position and vehicle speed while considering maximum and minimum torques. The maximum torque and the minimum torque are converted while considering the possible transmission ratio ÜM to the transmission output end. In a preferred embodiment, the procedure described hereinafter for forming the driver command torque is correspondingly utilized.

In other embodiments, other procedures, which are known from the state of the art, are used to form a driver command torque wherein the actual transmission ratio Ü is evaluated and to form the predicted driver command torque wherein the future possible transmission ratio ÜM is considered.

Figure 3:
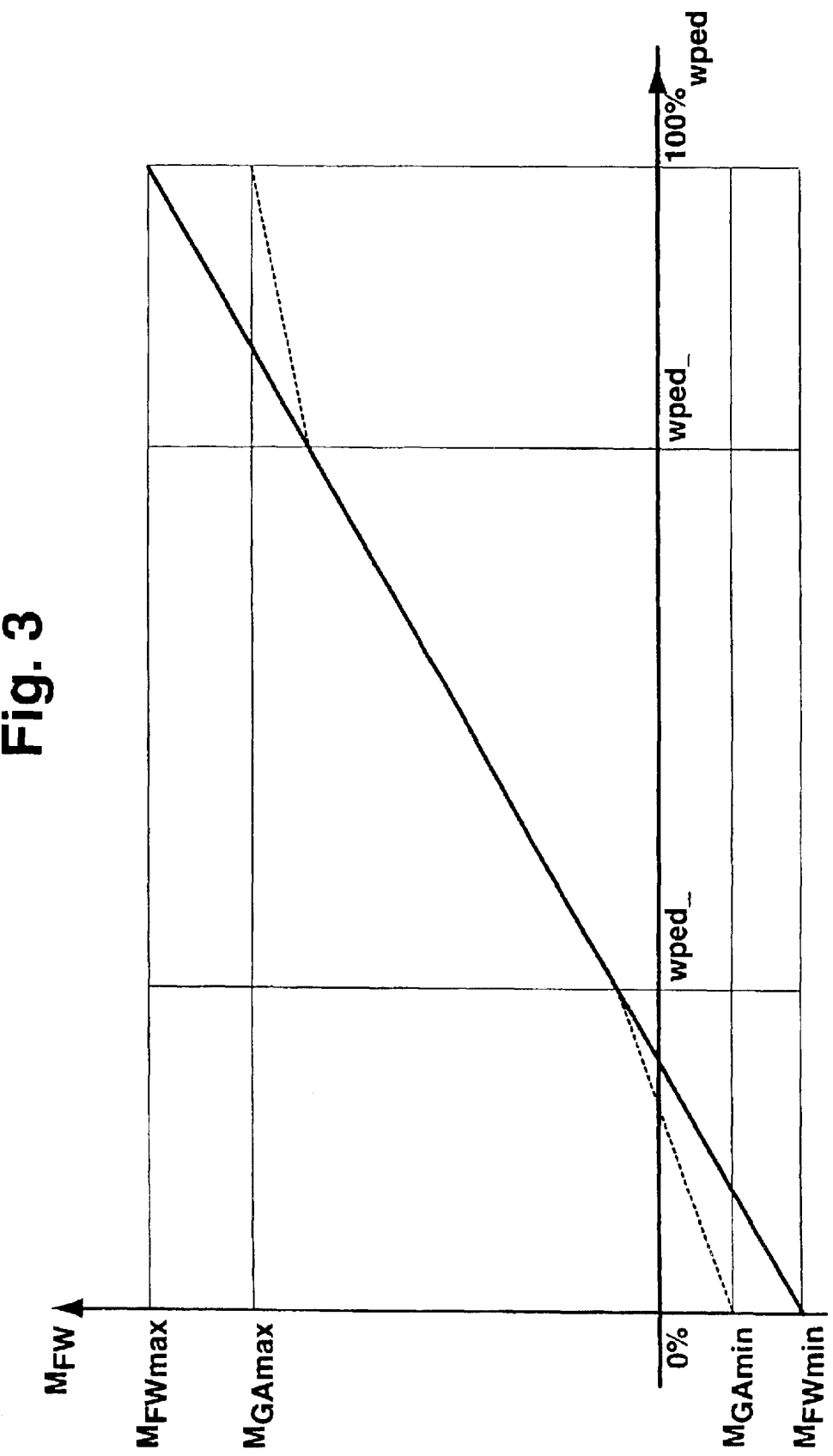
FIG. 3 is a graph showing an advantageous procedure for determining a driver command torque on the basis of a transmission output torque.
Figure 4:
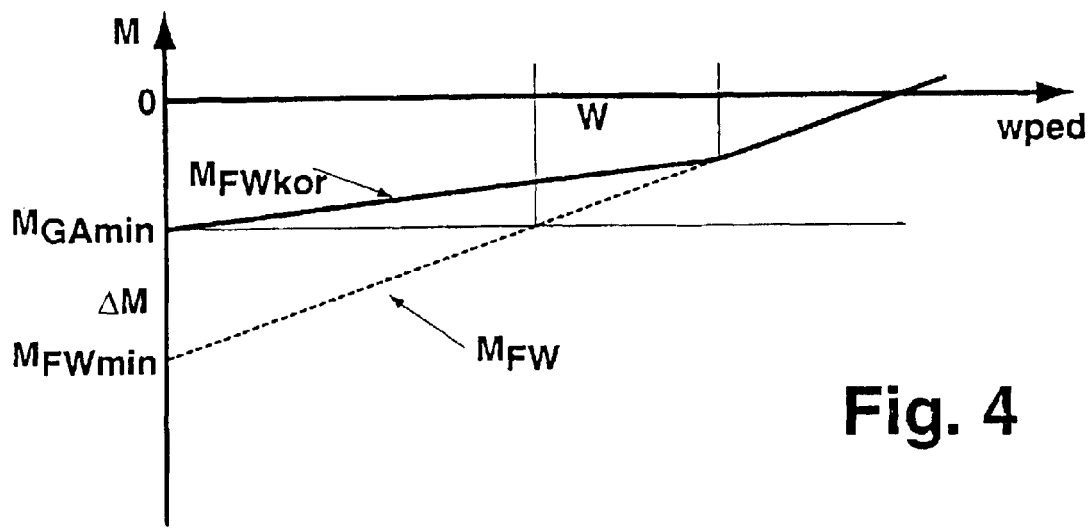
FIG. 4 is a detail view of the lower portion of the characteristic line shown in FIG. 3; and, FIG. 5 is a detail view of the upper portion of the graph shown in FIG. 3.
Figure 5:
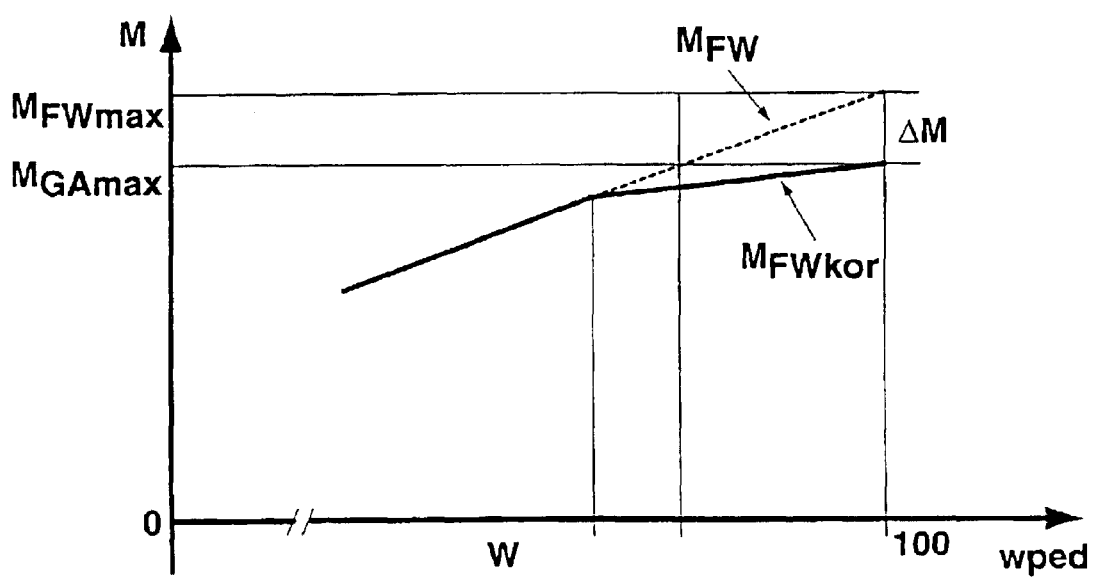
Figure 3:
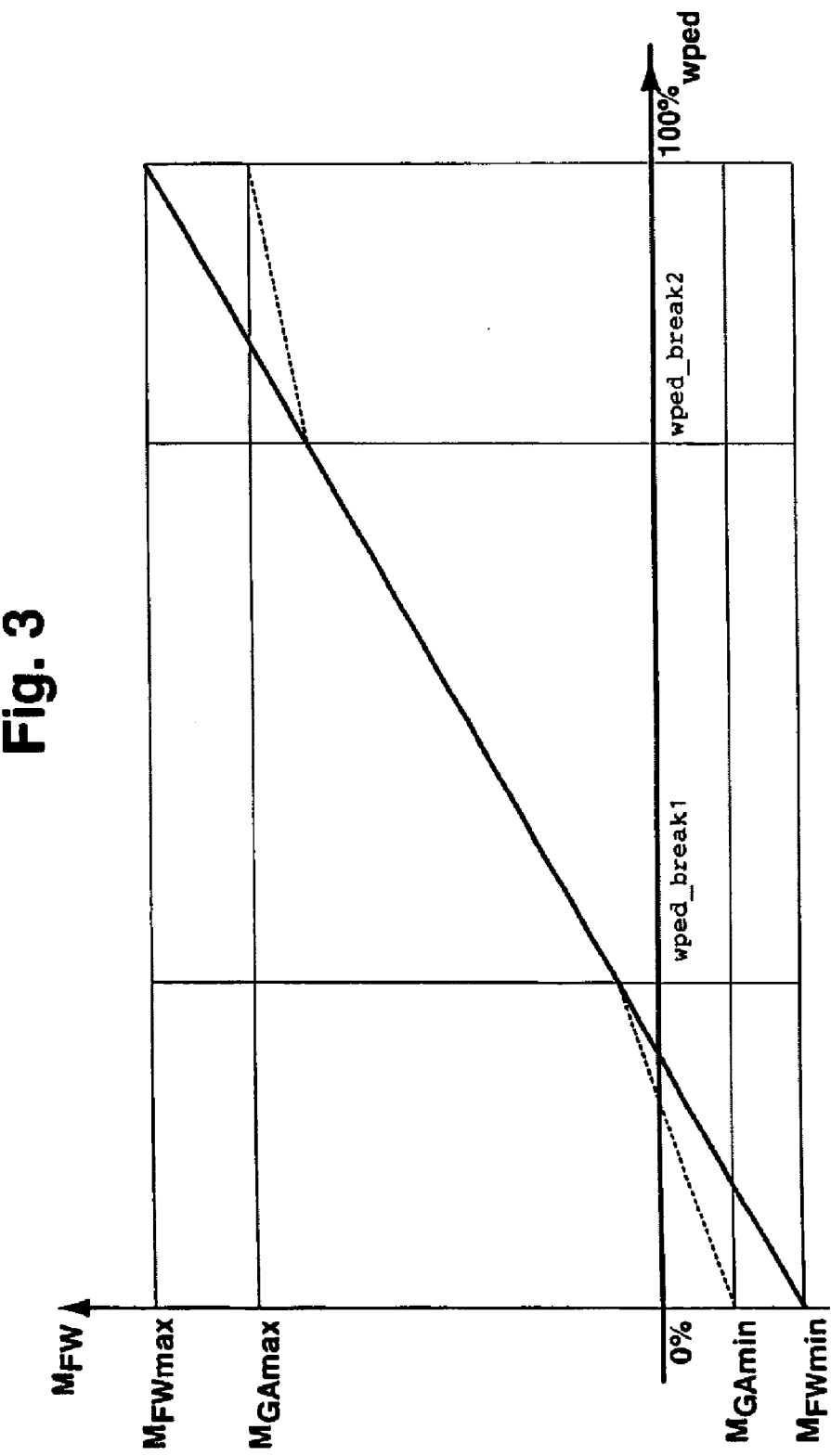
Figure 4:
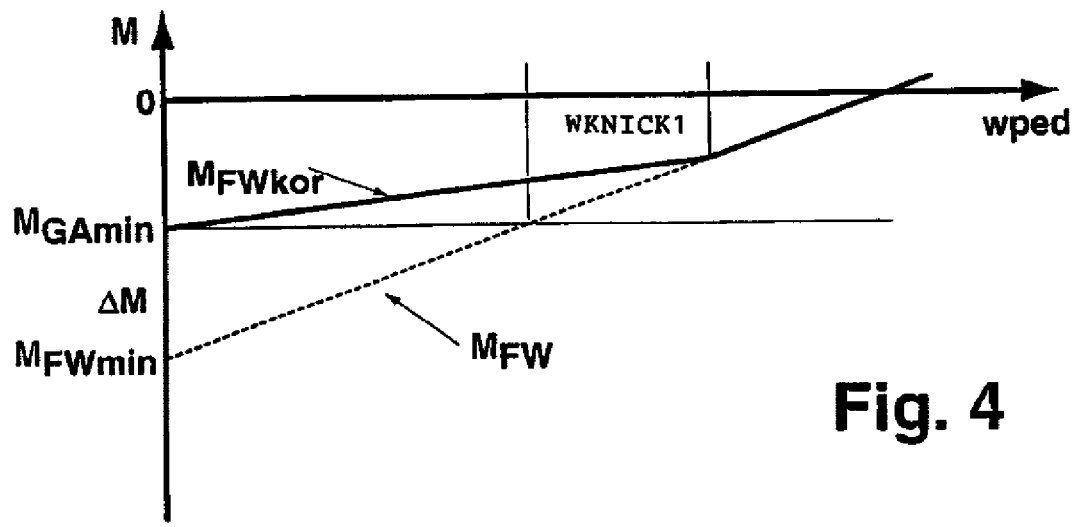
Figure 5:
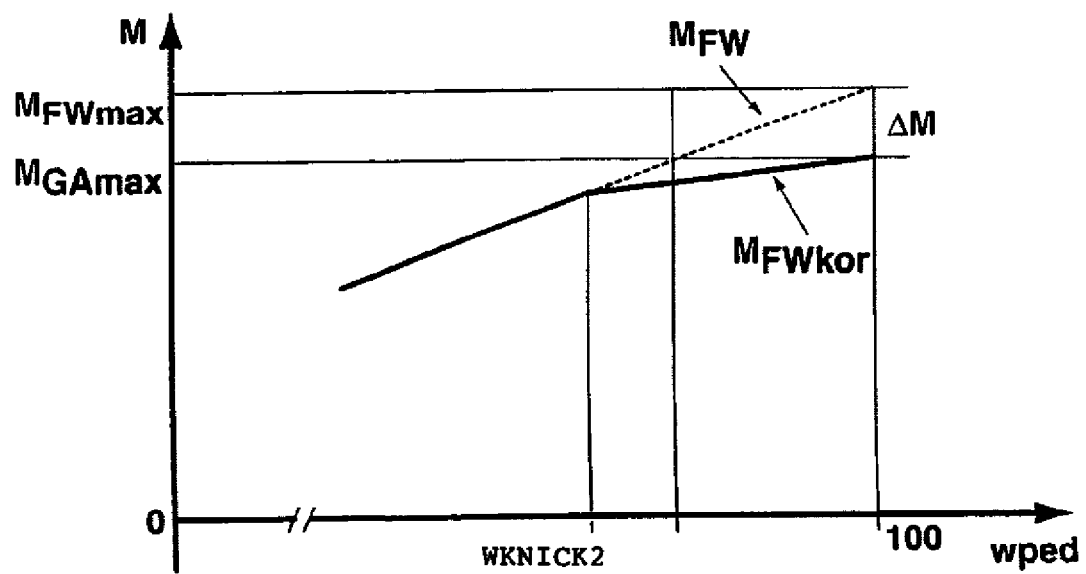

The diagrams of FIGS. 3 to 5 serve to explain a specific procedure for forming the driver command as a transmission output torque.

In FIG. 3, an advantageous procedure for determining a driver command torque on the basis of transmission output torque is shown. Here, dead travel is effectively avoided. The driver command torque defines an absolute torque command at the transmission output formed in dependence upon the accelerator pedal position (for example, by means of a characteristic line). This torque is adjustable between a maximum value MGAMAX and a minimum value MGAMIN. As shown in FIG. 2, these limit values are pregiven as clutch torque MMIN and MMAX and are converted by means of the transmission ratio Ü to the transmission output. In one embodiment, the maximum and minimum torque values are computed as in the state of the art mentioned initially herein. The inner torques described there are converted to engine output torques; that is, the inner loss torques of the engine are subtracted. In this way, in the case of overrun operation, the special situation occurs that the minimum torque corresponds to the negative value of the loss torque.

The characteristic field for determining the driver command is dependent upon the vehicle speed and the accelerator pedal position WPED and is therefore independent of gear. The absolute driver command torque is determined in dependence upon the vehicle speed and the accelerator pedal position and is so scaled within the pregiven maximum and minimum values that the total accelerator pedal path between 0% and 100% can be used. In this way, a reproducible reaction of the drive results from each pedal position (and vehicle speed). In order to achieve this, the determined driver command value is corrected in dependence upon the above-mentioned limit values as shown in FIG. 3 with the broken lines. FIG. 3 shows a diagram wherein the driver command torque MFW is plotted as a function of the accelerator pedal position WPED. The illustrated characteristic line applies for a constant vehicle speed. The accelerator pedal position is changeable between 0% and 100%; whereas, the driver command torque value, which is determined from the characteristic field or characteristic line, is changeable between a minimum value MFWMIN assigned to the position 0% and a maximum value MFWMAX assigned to the value 100%. The scaling takes place on the basis of the difference ΔM between the minimum possible torque MGAMIN and the minimum requested torque MFWMIN for the lower part of the accelerator pedal position or between the maximum possible torque MGAMAX and the maximum requested torque MFWMAX for the upper part of the accelerator pedal position. In an applicable characteristic line, the particular break point WPED_break is outputted in dependence upon the difference ΔM. If ΔM is greater than zero, then the driver command torque MFW is corrected via a corrective algorithm in such a manner in the region below the lower break point or above the upper break point so that the corrected torque MFWKORR corresponds to the minimum possible torque or the maximum possible torque at pedal positions 0% and 100%, respectively, and is modified up to the break point by a constant corrective factor. The driver command remains unchanged between the two break points. For a released accelerator pedal, in idle, the driver command torque corresponds to the minimum possible torque MGAMIN. This is the torque that the engine must at least adjust in order to ensure a stable operation. The loss torques of the engine are also included in addition to the idle controller torque.

FIG. 4 shows the lower region of the characteristic line shown in FIG. 3. With the above-described correction, an increase of the driver command torque MFWKORR takes place when there is a drop below the minimum engine torque (please see the broken line in FIG. 4). First, the difference ΔM between the minimum possible and pregiven driver command torque is formed. In dependence upon this value, the value WKNICK1 is read out from a characteristic line below which a correction of the driver command torque MFW takes place. If the minimum possible torque value MGAMIN is greater than the minimum requested torque MFWMIN as shown in FIG. 4, then a correction of the driver command torque takes place in accordance with the following equation.

MFWKORR(WPED)=MFW(WPED)+((WKNICK1−WPED)*ΔM)/ WKNICK1

In this way, the dead travel, which occurs without correction, is effectively avoided up to the intersect point of MGAMIN and MFWMIN.

The same applies to the upper region of the driver command which is shown in FIG. 5. Here, a reduction of the driver command torque takes place when MFWMAX is greater than the maximum possible torque MGAMAX. Here too, the difference ΔM is first formed between MGAMAX and MFWMAX. The break point WKNICK2 is read out from a pregiven characteristic line in dependence upon this difference value. If the maximum pregiven value MFWMAX is greater than the maximum possible value MGAMAX (ΔM greater than zero), then a correction of the driver command torque takes place starting at the break point WKNICK2 in accordance with the following relationship:

MFWKORR(WPED)=MFW(WPED)−((WPED−WKNICK2)*ΔM)/ (100−WKNICK2)

In this way, occurring dead travel in the area of the fully depressed accelerator pedal is effectively avoided.

The above illustration applies to a vehicle speed value. One can proceed in the same manner for other vehicle speed values.

It is understood that the foregoing description is that of the preferred embodiments of the invention and that various changes and modifications may be made thereto without departing from the spirit and scope of the invention as defined in the appended claims.

What is claimed is:

1. A method for controlling a drive unit of a motor vehicle connected to a drive train including a transmission, the method comprising the steps of:

determining a first driver command value representing a torque at an output end of said transmission under existing transmission ratios in said drive train by forming said first driver command value at least in dependence upon an accelerator pedal position;

determining a predicted second driver command value which results from a future possible transmission ratio in said drive train; and, outputting said predicted second driver command value to an interface.

2. The method of claim 1, wherein a vehicle speed is considered in the formation of said first driver command value.

3. A method for controlling a drive unit of a motor vehicle connected to a drive train including a transmission, the method comprising the steps of:

determining a driver command value representing a torque at an output end of said transmission by forming said driver command value at least in dependence upon an accelerator pedal position while considering existing transmission ratios in said drive train;

determining a predicted driver command value while considering other transmission ratios in said drive train;

outputting said predicted driver command value to an interface; and, wherein a minimum possible torque is formed from a minimum possible clutch torque while considering the current transmission ratio; and, in overrun operation, a negative value of the loss torque of said drive unit is pregiven as a minimum torque.

4. A method for controlling a drive unit of a motor vehicle connected to a drive train including a transmission, the method comprising the steps of:

determining a driver command value representing a torque at an output end of said transmission by forming said driver command value at least in dependence upon an accelerator pedal position while considering existing transmission ratios in said drive train;

determining a predicted driver command value while considering other transmission ratios in said drive train;

outputting said predicted driver command value to an interface; and, wherein, for the determination of said predicted driver command, a minimum possible torque is formed from a minimum possible clutch torque while considering a future possible transmission ratio.

5. A method for controlling a drive unit of a motor vehicle connected to a drive train including a transmission, the method comprising the steps of:

determining a driver command value representing a torque of the drive train which occurs at an output end of said transmission on the basis of an accelerator pedal position and a minimum possible value and a maximum possible value;

controlling said drive unit in dependence upon the determined driver command value;

utilizing a pregiven dependency of a driver command torque on said accelerator pedal position to determine said driver command value; and, correcting said accelerator pedal position to a minimum possible torque and a maximum possible torque in the region of the end positions of said accelerator pedal.

6. The method of claim 5, comprising the further steps of:

pregiving a fixed relationship between said accelerator pedal position and said driver command value;

selecting a break point in dependence upon the difference between an extreme value of said driver command value in accordance with the pregiven relationship and the maximum possible torque or the minimum possible torque; and, causing a correction of the determined driver command value when reaching said break point via the accelerator pedal position.

7. The method of claim 6, wherein the correction of said driver command value takes place so that for a released accelerator pedal or a maximally actuated accelerator pedal, the minimum possible torque or the maximum possible torque is outputted as the driver command value; and, a continuous change of said driver command value takes place in dependence upon the accelerator pedal position between said break point and the extreme value.

8. The method of claim 5, wherein a vehicle speed is considered in the formation of said driver command value.

9. The method of claim 5, wherein the minimum possible torque from a minimum possible clutch torque is formed while considering a current transmission ratio; and, in overrun operation, a negative value of the loss torque of said drive unit is pregiven as a minimum torque.

10. The method of claim 1, wherein, for the determination of said predicted driver command value, the minimum possible torque from a minimum possible clutch torque is formed while considering a future possible transmission ratio.

11. An arrangement for controlling a drive unit connected to a drive train including a transmission, the arrangement comprising:

a control unit including:

means for determining a quantity representing an accelerator pedal position;

means for determining a first driver command value from said quantity and said first driver command value, under existing transmission ratios in said drive train, corresponding to a torque at an output end of said transmission;

means for controlling said drive unit in dependence upon said first driver command value;

means for determining a predicted second driver command value from the accelerator pedal position which results from a future possible transmission ratio in said drive train; and, means for outputting said predicted second driver command value to an interface to other control systems.

12. An arrangement for controlling a drive unit connected to a drive train including a transmission, the arrangement comprising:

a control unit including:

means for determining a quantity representing an accelerator pedal position;

said quantity being converted into a driver command value while considering a current transmission ratio in said drive train and a minimum possible value and a maximum possible value;

said driver command value representing a torque which occurs at an output end of said transmission of said drive train;

means for controlling said drive unit in dependence upon said driver command value;

means for using a pregiven dependency of said driver command value on said accelerator pedal position to determine a driver command value; and, means for correcting said accelerator pedal position in the region of the end positions of said accelerator pedal to a minimum possible torque and a maximum possible torque.

* * * * *

UNITED STATES PATENT AND TRADEMARK OFFICE
CERTIFICATE OF CORRECTION

PATENT NO.   : 6,814,688 B2
DATED        : November 9, 2004
INVENTOR(S)  : Volkmar Foelsche and Mario Kustosch It is certified that error appears in the above-identified patent and that said Letters Patent is hereby corrected as shown below:

Drawings,
FIG. 3, The line between 0% and 100%: delete first "wped_" and substitute -- wped_break1 -- therefor; The line between 0% and 100%: delete second "wped_" and substitute -- wped_break2 -- therefor.
FIG. 4, 0 line: delete "W" and substitute -- WKNICK1 -- therefor.
FIG. 5, 0 line: delete "W" and substitute -- WKNICK2 -- therefor.

Column 7,
Line 57, -- value -- should be inserted after "command".

Signed and Sealed this

Fifteenth Day of March, 2005

JON W. DUDAS
*Director of the United States Patent and Trademark Office*